United States Patent [19]

Washbourn et al.

[11] E Patent Number: Re. 32,610

[45] Reissued Date of Patent: Feb. 23, 1988

[54] ELECTRIC ACTUATORS

[75] Inventors: Jack Washbourn, Chippenham; Howard F. Cogan, Leire, both of England

[73] Assignee: Westinghouse Brake and Signal Co., Ltd., United Kingdom

[21] Appl. No.: 924,920

[22] Filed: Oct. 30, 1986

Related U.S. Patent Documents

Reissue of:

[64] Patent No.: 4,546,296
Issued: Oct. 8, 1985
Appl. No.: 607,632
Filed: May 7, 1984

[30] Foreign Application Priority Data

| | | | |
|---|---|---|---|
| May 12, 1983 | [GB] | United Kingdom | 8313102 |
| Jun. 23, 1983 | [GB] | United Kingdom | 8317063 |
| Jun. 23, 1983 | [GB] | United Kingdom | 8317064 |
| Mar. 20, 1984 | [GB] | United Kingdom | 8407177 |
| Mar. 20, 1984 | [GB] | United Kingdom | 8407178 |

[51] Int. Cl.[4] ..... H02K 7/10

[52] U.S. Cl. ..... 318/372; 318/254; 318/466; 318/362; 318/371; 318/273; 318/269; 310/80; 310/83; 188/162

[58] Field of Search ..... 318/371, 372, 362, 301, 318/280, 375, 254, 261, 269, 273, 614; 310/77, 80, 83; 180/170; 188/162, 158, 74, 33; 246/182 R; 192/1, 116.5, 147, 140; 267/168

[56] References Cited

U.S. PATENT DOCUMENTS

| | | | |
|---|---|---|---|
| 874,219 | 12/1907 | Mahoney | 188/162 X |
| 2,418,351 | 4/1947 | Jackson | 318/261 X |
| 2,446,393 | 8/1948 | Russell | 310/83 W X |
| 2,479,019 | 8/1949 | Ochtman | 310/83 |
| 2,480,212 | 8/1949 | Baines | 310/83 |
| 2,756,014 | 7/1956 | Leibfried | 267/170 X |
| 3,013,624 | 12/1961 | Remer et al. | 188/162 X |
| 3,039,758 | 6/1962 | Gratzmuller | 267/168 X |
| 3,074,517 | 1/1963 | Köhli | 318/280 X |
| 3,159,758 | 12/1964 | Hemperly et al. | 310/83 |
| 3,399,879 | 9/1968 | Hojo et al. | 267/178 |
| 3,659,683 | 5/1972 | Betzing | 188/162 |
| 4,136,304 | 1/1979 | Baechler et al. | 318/372 |
| 4,138,632 | 2/1979 | Pauwels et al. | 318/599 |
| 4,307,799 | 12/1981 | Zouzoulas | 318/375 X |
| 4,364,111 | 12/1982 | Jocz | 318/466 X |
| 4,393,319 | 6/1983 | Bock | 310/80 |
| 4,445,075 | 4/1984 | Fry | 318/434 |
| 4,463,291 | 7/1984 | Usry | 318/254 |

FOREIGN PATENT DOCUMENTS

| | | |
|---|---|---|
| 458516 | 1/1937 | United Kingdom . |
| 503096 | 4/1939 | United Kingdom . |
| 909176 | 10/1962 | United Kingdom . |

*Primary Examiner*—William M. Shoop, Jr.
*Assistant Examiner*—Paul Ip
*Attorney, Agent, or Firm*—Larson and Taylor

[57] ABSTRACT

An electric actuator which comprises an electric motor operable to a varying degree correspondingly to cause a spring to generate on an output member an output force which varies in accordance with the varying degree of operation of the electric motor.

16 Claims, 10 Drawing Figures

10'
100
102
103
104
105
106
107
108
109
110
A0
A1
A2
A3
A4
A5
A6
A7
B0
B1
B2
B3
B4
B5
B6
B7
C0
C1
C2
C3
C4
C5
C6
C7
D1
D2
D3
D4
D5
D6
D7
E1
E2
E3
E4
E5
E6
0
1
2
3
4
5
6
7

ELECTRIC ACTUATORS

Matter enclosed in heavy brackets [ ] appears in the original patent but forms no part of this reissue specification; matter printed in italics indicates the additions made by reissue.

This invention relates electric actuators and more particularly, although not exclusively, to electric brake actuators.

Electric actuators are known which comprise an electric motor operable to a varying degree directly to exert on an output member an output force which varies in accordance with the degree of operation of the electric motor. However, such direct-acting electric motor actuators suffer various disadvantages. Firstly, relatively sophisticated feed-back circuitry needs to be provided to ensure that the motor is controlled to provide just that output force which is required. Secondly, because of hysteresis, operation of the motor to a particular degree will not effect the same value of the output force if the motor is being operated to reduce the value of the output force to that now required from some higher previous value, as it will if the motor is being operated to increase the value of the output force to that now required from some lower previous value. Either, therefore, the hysteresis curve has to be predetermined and allowance made in the degree of operation of the motor in dependence upon whether a higher or a lower value of the output force is being called for or even further complicated feed-back circuitry is required. Even if the hysteresis curve is pre-determined, the shape of the curve may vary between different actuators and may vary over time so that operation of the motor in accordance with a predetermined curve may not be valid.

The present invention seeks to overcome these problems by providing an electric actuator which comprises an electric motor operable to a varying degree corresponding to cause a spring to generate on an output member an output force which varies in accordance with the varying degree of operation of the electric motor.

The arrangement may be such that one end of the spring abuts the output member and the opposite end abuts a second member movable by the electric motor in the direction of the length of the spring. The second member may be threadedly-engaged with a third member relative rotation of which is effected by operation of the electric motor.

Detection means may be provided for detecting the force exerted on the output member, the detection means being such as to generate a signal indicative of the force being generated, the signal effecting cessation of operation of the electric motor when the signal is indicative of the generated force being that required. The detection means may be a strain gauge or, alternatively, be responsive to the length of the spring. In the latter case and where one end of the spring abuts the output member and the opposite end abuts a second member movable by the electric motor in the direction of the length of the spring, the detection means may comprise a first part movable with the output member and a second part movable with the second member. The second part may then be variably positionable with respect to the second member in the direction of the length of the spring. When the actuator is a brake actuator for a vehicle, adjustment means may be provided for positioning the second part of the detection means with respect to the second member in accordance with the load of the vehicle. In this case, one of the parts of the detection means may carry a series of switches and the other part cam means for operating the switches. The second part may be threadedly-engaged with the second member and the second part and the second member relatively rotatable variably to position the second part with respect to the second member.

There may also be provided a final output member to which the output force generated on the output member can be transmitted, operation of the electric motor to generate the output force initially moving the spring, the output member and the final output member bodily together until further movement of the final output member is arrested whereafter continued operation of the electric motor compresses the spring to generate the output force. There may then be provided means between the output member and the final output member which detects the arrest of the movement of the final output member.

Limiting means may be provided by which the maximum valve of the generated output force can be limited. These limiting means may then be operable to terminate operation of the electric motor when the valve of the generated output force reaches said maximum value.

Embodiments of the present invention will now be described in greater detail, by way of example only, with reference to the accompanying drawings of which:

Figure 3:
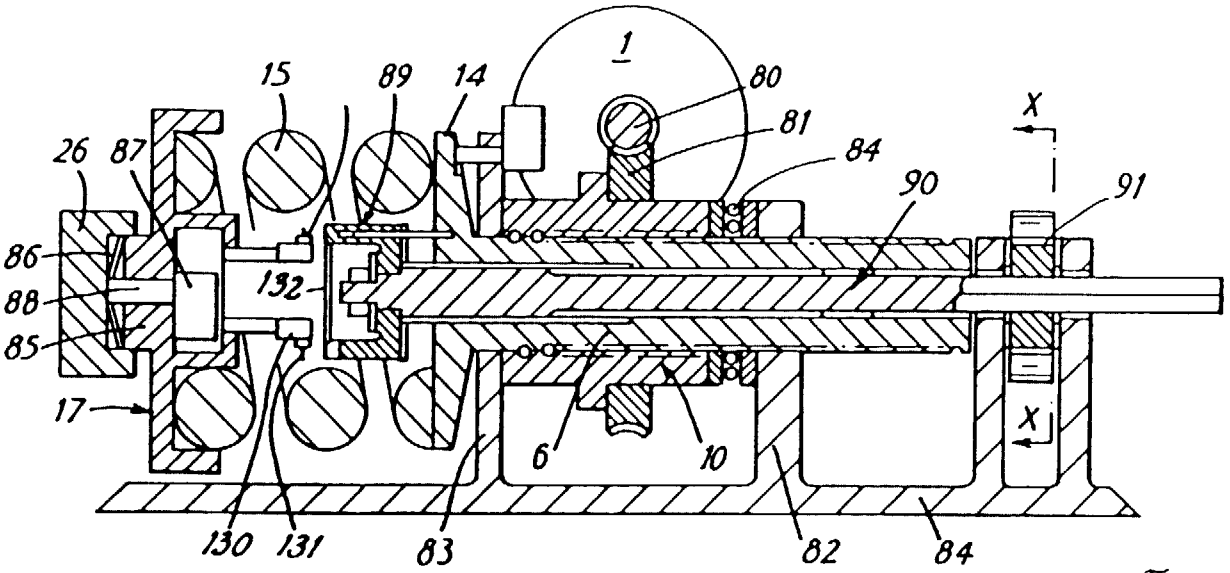
FIG. 3 shows a longitudinal cross-sectional view of a second embodiment.
Figure 5:
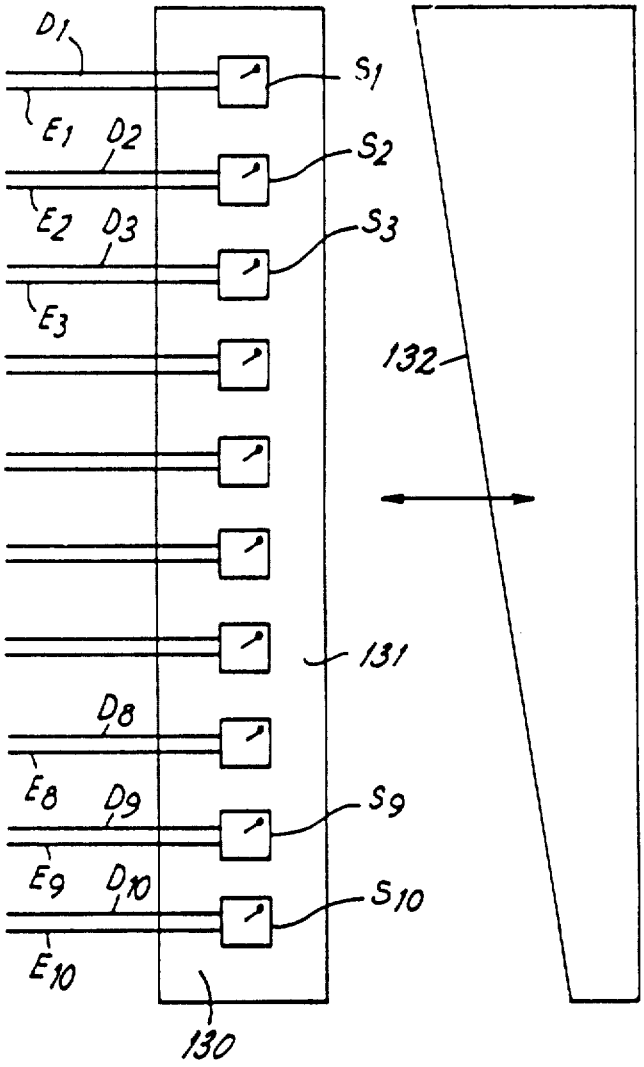
Figure 6:
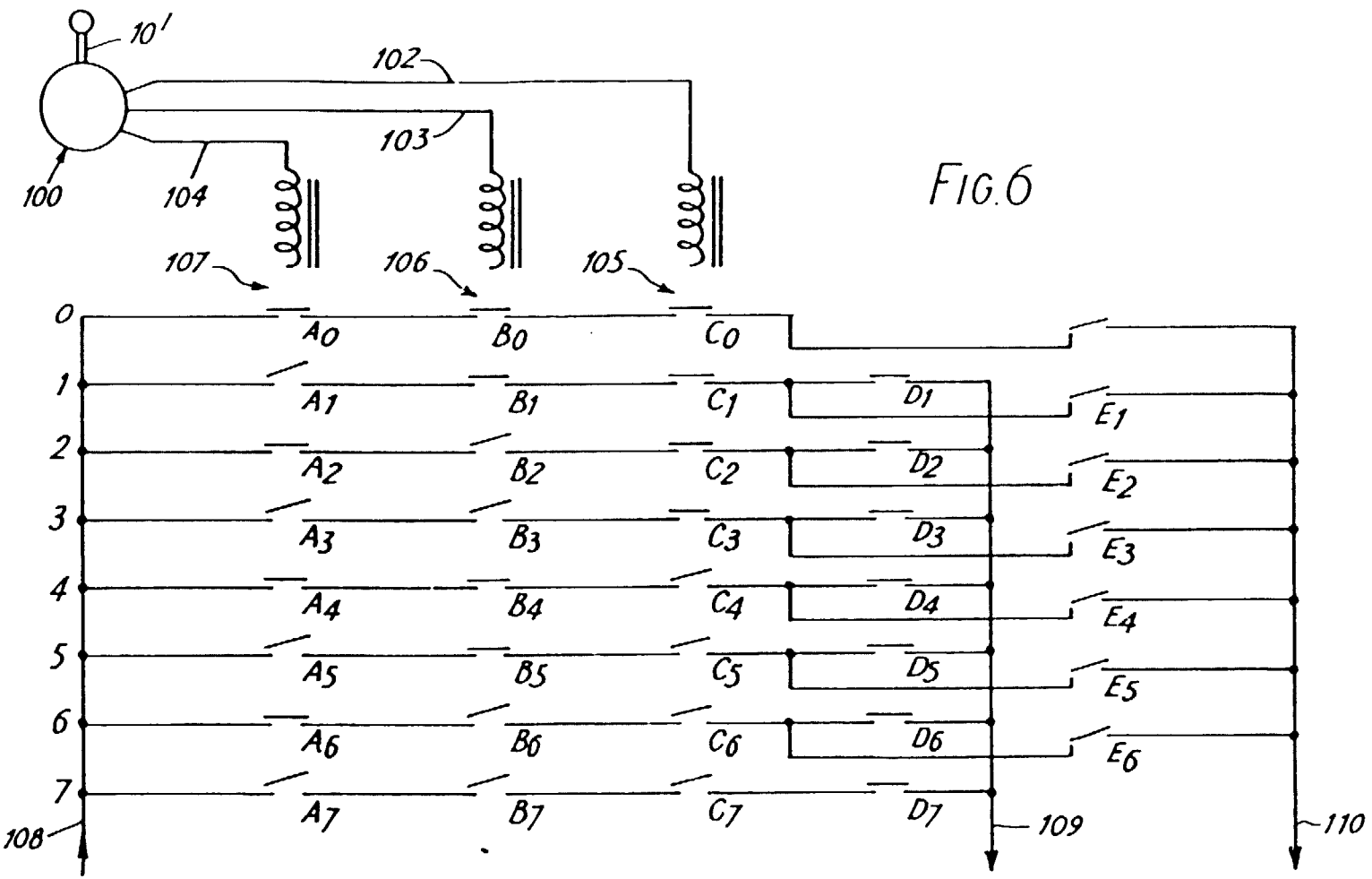
Figure 7:
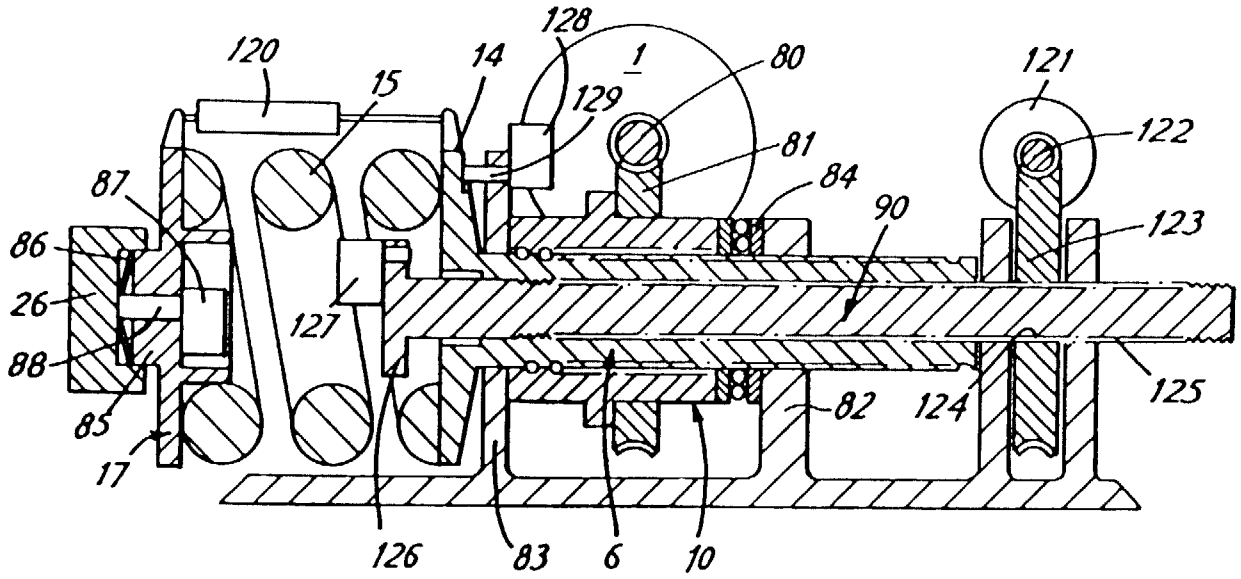
Figure 8:
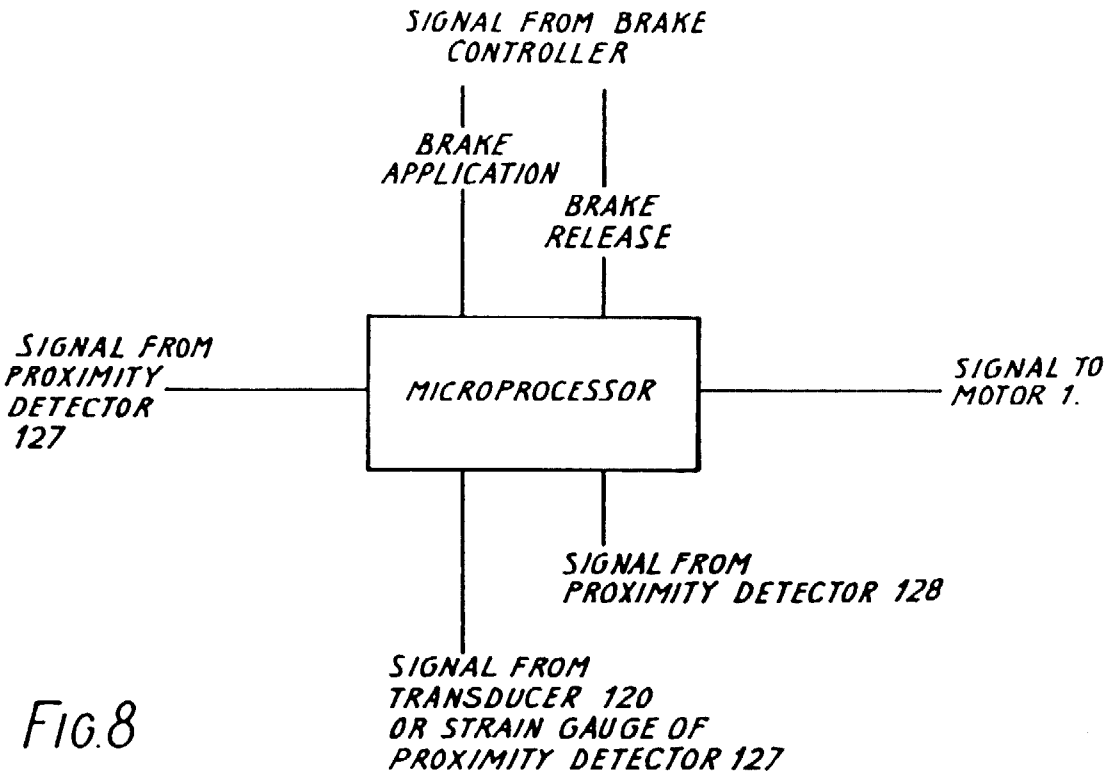
Figure 9:
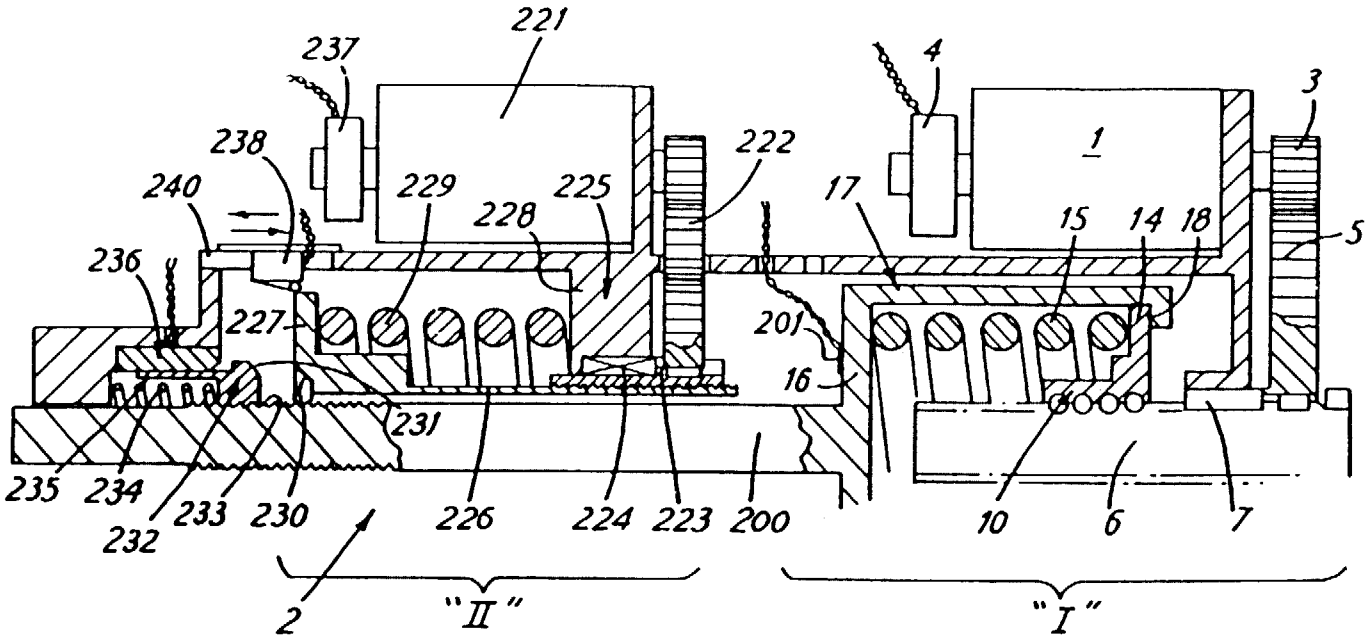

FIG. 5 diagrammatically shows the arrangement of the switches and the cam for use in FIG. 3;

FIG. 6 shows part of the electrical circuit for operating the actuator of FIG. 3;

FIG. 7 shows a longitudinal cross-sectional view of a third embodiment;

FIG. 8 shows, diagrammatically, the electrical circuit for controlling the actuator of FIG. 7;

FIG. 9 is a longitudinal cross-sectional view of a fourth embodiment, and

Figure 4:
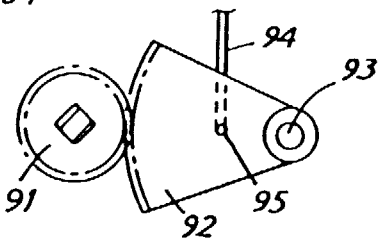
FIG. 4 shows a scrap transverse cross-sectional view on a line x—x of FIG. 3.
Figure 10:
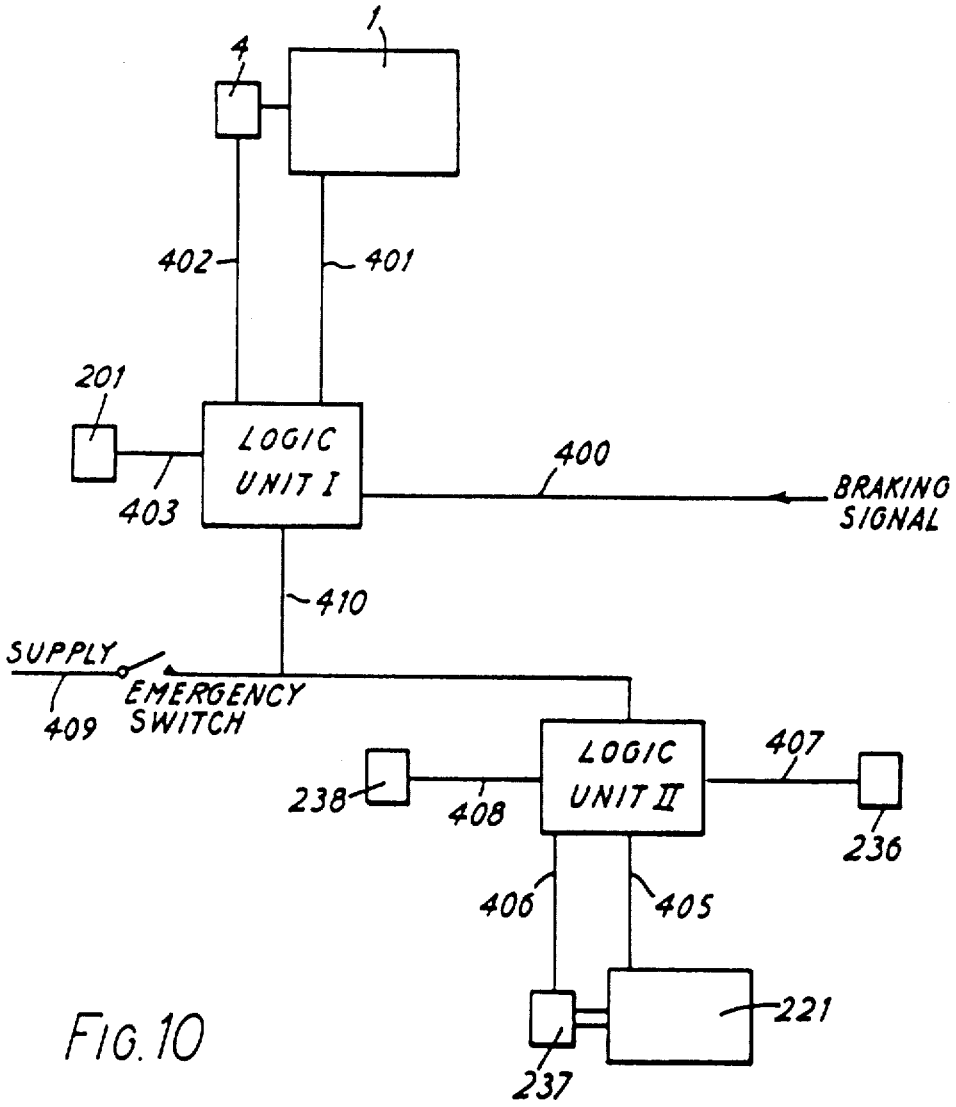

FIG. 10 shows, diagrammatically, the electrical circuit for control of the embodiment of FIG. 4.

Figure 1:
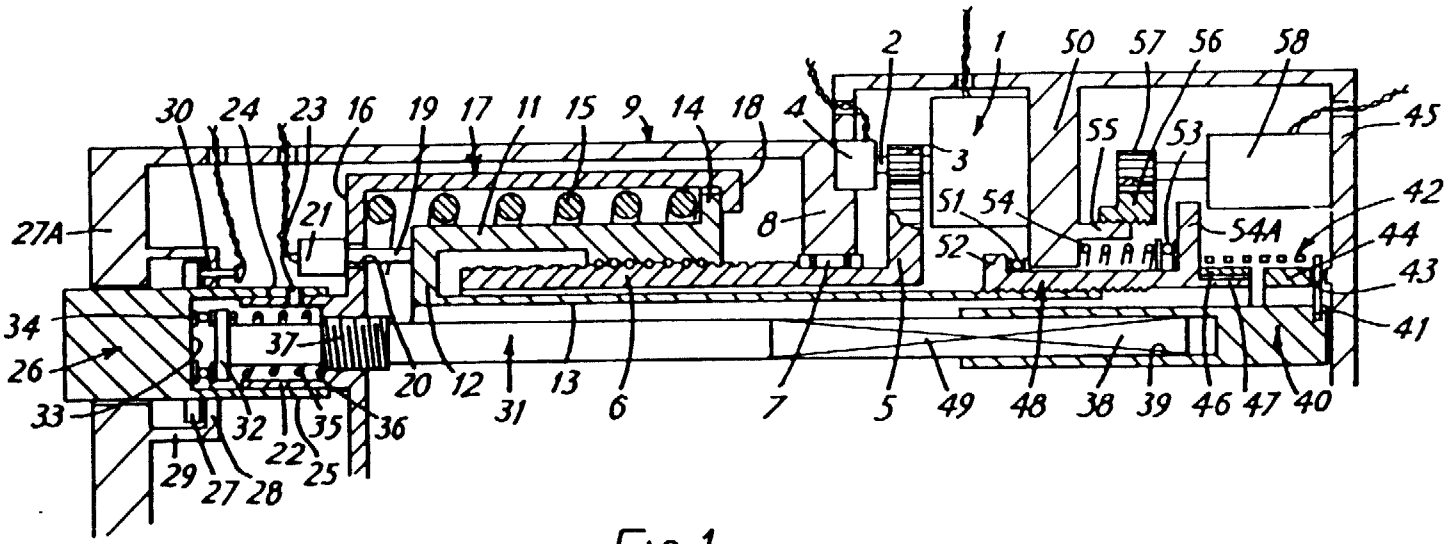
FIG. 1 is a longitudinal half-sectional view of one embodiment.

Referring to FIG. 1, the actuator comprises an electric motor 1 of which the output shaft 2 passes through a pinion 3 secured on the shaft 2, to an electrically-operated clutch 4. The pinion 3 is meshed with a gearwheel 5 secured to one end of a ball-screw tube 6 which is mounted for rotation in bearing 7 in an intermediate wall 8 of the actuator housing 9.

Threadedly engaged with the ball-screw tube 6 is a nut 10 having a leftwardly-extending tubular extension 11 at the right-hand extremity of which is a radially-inwardly projecting flange 12. From the inner periphery of the flange 12 extends rightwardly a tube 13 lying co-axially with the ball-screw tube 6.

Projecting radially outwardly from the end of the nut 10 remote from the tubular extension 11, is a second flange 14. The flange 14 is abutted by one end of a spring 15 the other end of which abuts the end wall 16 of a spring housing 17 which constitutes the output member of the actuator. The housing 17 has, at its end remote from the end wall 16, an inwardly-projecting flange 18. As can be seen from FIG. 1, the spring 15 is trapped in the housing 17 by the flange 14 on the nut 10 being trapped between the spring 15 and the flange 18 of the spring housing 17. Extending from the flange 12 on the nut 10 is a shaft 19 which passes through a bore 20 in the end wall 16 of the spring housing 17, to a transducer 21 mounted on that end wall 16. The transducer 21 measures the force exerted by the spring 15 by measuring its degree of compression as will be hereinafter seen.

The end wall 16 of the spring housing 17 is provided with an axially-projecting tubular extension 22.

The tubular extension 22 carries a pin 23 which extends into a slot 24 in a tubular extension 25 of a final output member 26. Hence, the pin 23 and the slot 24 constitute a pin-and-slot connection 23/24 between the two tubular extension 22 and 25 which permits relative axial movement between the two whilst preventing relative rotation between them.

Surrounding the final output member 26 is a friction ring 27. This ring frictionally engages the member 26 but, under sufficient force, can be slid either way axially of the final output member 26. The friction ring 27 is housed between the end wall 27 of the actuator housing 9 and a flange 28 on the end of a tubular projection 29 which projects inwardly of the actuator housing 9. Hence, the degree of movement of the friction ring 27 is limited to between the end wall 27 and the flange 28. Should the final output member 26 be moved a greater distance then this limited movement, then the friction ring 27 being thereby caused to engage the end wall 27 or the flange 28, as the case may be it will be caused frictionally to slide on the final output member 26. Mounted in the flange 28 is a pair of electrical contacts 30 located so as to be "made" by the friction ring 27 when it abuts the flange 28.

Projecting co-axially within the tubular extensions 22 and 25 is one end of a shaft 31. At its extremity of this end the shaft 31 has a flange 32 between which and the internal face 33 of the final output member 26, is a thrust bearing 34. Also, extending between this flange 32 on the opposite side from the bearing 34, is a spring 35 of which one end abuts the flange 32 and the other abuts an internal end face 36 of the end wall 36 of the spring housing 17. By this spring 35, the shaft 31 is urged to the left to engage its flange 32 with the thrust bearing 34.

The shaft 31 passes through the end wall 16 of the spring housing 17 and is there threadedly engaged with the end wall 16 by means of the threaded portion 37 of the shaft 31.

The shaft 31 passes co-axially through the tube 13 of the nut 10 and, at its end portion 38 remote from its flange 32, is square in cross-section. The end portion 38 of the shaft 31 is received in a similarly cross-sectioned bore 39 in a clutch-operating part 40. This part 40 receives the tail 41 of a square-section wire spring 42, which passes through a circumferential slot 43 in a tubular boss 44 extending inwardly of the actuator housing 9 from its end wall 45. The spring 42 is wrapped-around a clutch part 46 so that the spring 42 and part 46 constitutes a one-way rotational clutch 42/46 by which the clutch-operating part 40 is clutched for rotation with the clutch part 46 for rotation therewith in one direction but is free to rotate relative to the clutch part 46 in the opposite direction.

The clutch part 46 is in the form of an internally-splined sleeve, the splines of which are interdigitated with corresponding splines on a hub 47 of a second nut 48. Thus, the clutch part 46 can move axially with respect to the nut 48 but is non-rotationally engaged therewith.

The nut 48 is threadedly-engaged with a threaded end portion 49 of the tube 13. The nut 48 is supported for rotation in a second intermediate wall 50 of the actuator housing 9 by a first thrust bearing 51 located between a flange 52 on the nut 48 and one side of the intermediate wall 50 and by a second thrust bearing 53 loated between a second flange 54 on the nut 48 and a spring 54 one end of which abuts the second bearing 53 and the other side of the intermediate wall 50 of the housing 9.

Surrounding the spring 54 is a threaded boss 55 projecting from the intermediate wall 50 and threadedly-engaged by an adjustable stop 56. The exterior wall of the stop 56 is toothed and engaged by a pinion 57 arranged to be driven by a second electric motor 58. It will be seen that operation of the electric motor 58 will adjust the stop 56 axially on the boss 55. The stop 56 is located to be in the path of and, therefore, to be abutted by, the flange 54 on the nut 48.

Figure 2:
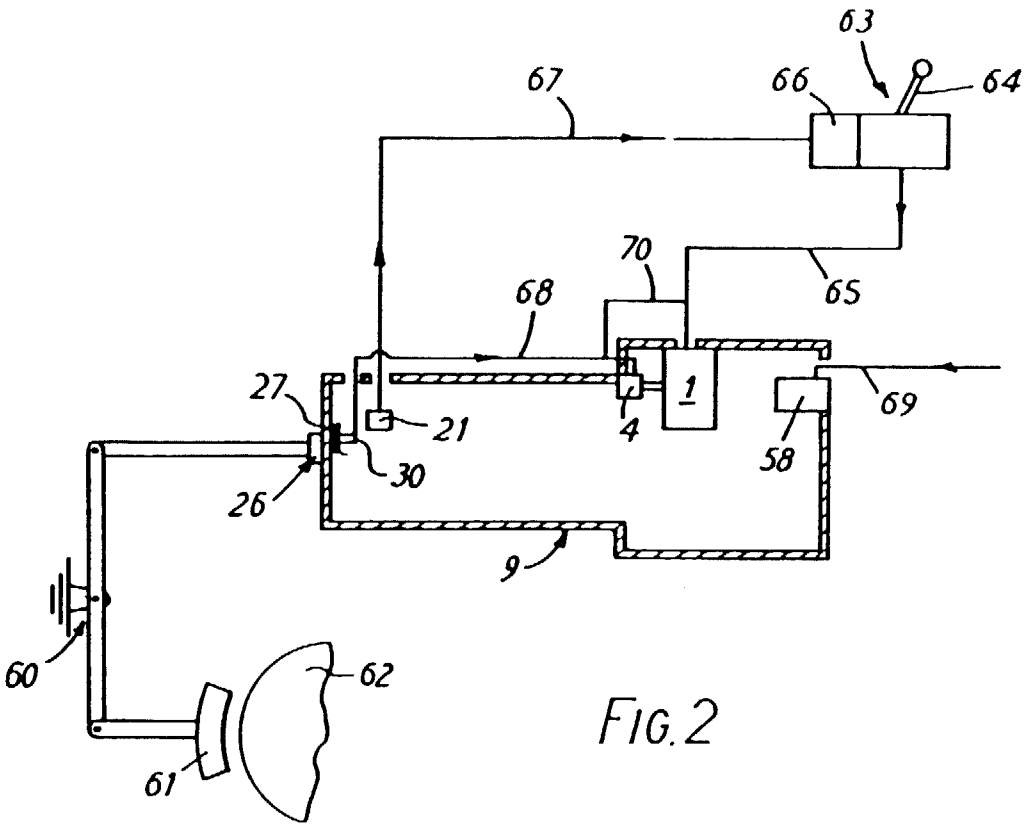
FIG. 2 shows the electrical circuit for the actuator of FIG. 1.

Referring now to FIG. 2 which shows the electrical circuit for controlling the actuator described above with reference to FIG. 1 being used as a railay brake actuator, the final output member 26 of the actuator is coupled, through a linkage mechanism 60 to a brake block 61 engageable with a railway vehicle wheel 62.

For controlling the brake block 61, there is a brake controller 63 operating the handle 64 of which generates over line 65 a signal indicative of the degree of braking required. This signal is fed to the electric motor 1. Fed back to a comparator 66 in the brake controller 63 over the line 67 from the transducer 21 is a signal indicative of the force being exerted by the spring 15 (FIG. 1).

The pair of contacts 30 are in the circuit 68 of the electrical clutch 4.

Applied over the line 69 to the second electric motor 58, is a signal indicative of the load of the railway vehicle.

The actuator shows in FIG. 1, controlled by its electrical circuit as shown in FIG. 2, operates as follows:

The actuator is shown in FIG. 1 in its "brakes released" condition.

In this condition, the motor 1 is de-energised and its clutch 4 energised by the "making" of the pair of contacts 30 being engaged by the friction ring 27.

The second motor 58 will have been energised over the line 69 to an extent indicative of the load of the railway vehicle. Such energisation of the motor 58 will have rotated the nut 56 on the threaded boss 55 axially to position it, again, in accordance with the load of the vehicle.

In this condition of the actuator, the brake block 61 will be clear of the wheel 62 by the required amount of normal clearance.

Brake Application

To effect a brake application, the handle 64 of the brake controller is operated to a degree to indicate the degree of braking required. Such operation will generate on line 65 an electrical signal which, firstly, over line 70 will de-energise the clutch 4 and, secondly, will energise the electric motor 1.

De-energisation of the clutch 4 frees the motor 1 for rotation upon its energisation and such consequential rotation will, through pinion 3, rotate the ball-screw tube 6. Rotation of tube 6 will feed the nut 10 to the left (as viewed in FIG. 1) carrying with it the spring housing (or output member) 17 as, there being little resistance to movement of the housing 17, the effort of the spring 15 will cause the housing 17 axially to move with the nut 10. The housing 17 will also carry with it the final output member 26 and the shaft 31 as these parts will be held together with the spring housing 17 by the spring 35. The movement of the final output member 26 will, through the linkage 60, move the brake block 61 into engagement with the wheel 62.

During this movement of the housing 17, the nut 48 will be caused to rotate on its bearings 51 and 53 (being retained in its axial position as shown in FIG. 1 by the spring 54) as the threaded portion 49 of the tube 13 is drawn through the nut 48.

After the brake block 61 has engaged the wheel 62, resistance to further movement by all those parts previously involved will now suddenly increase as this engagement resists further movement of the final output member 26. As this member 26 tends to stop, continued operation of the electric motor 1 under the influence of the signal being fed over line 65 will, continue the movement of the nut 10. The final output member 26 being temporarily arrested in its movement, the consequent continued movement of the spring housing 17 will collapse the spring 35; the housing 17 being permitted to continue its movement relative to the final output member 26 due to the pin-and-slot connection 23/24 between the tubular extensions 22 and 25 respectively of the housing 17 and the member 26.

As the spring 35 collapses, the shaft 31 being prevented from further axial movement by the arresting of the final output member 26, the shaft 31 will be forced to rotate as the threaded engagement of the housing 17 is forced along the threaded portion 37 of the shaft 31. Rotation of the shaft 31, through its square section portion 38 engaged in the bore 39 of the clutch operating part 40 (which, previously, merely moved axially relative to that part 40) will rotate the clutch operating part 40. Such rotation causes the clutch 41/42/46 to arrest the rotation of the nut 48.

The braking force now starting to be exerted by the brake block 61 on the wheel 63 will build up as the motor 1 is continued to be operated. The continued rotation of the motor 1 will continue to "screw" the nut 10 to the left now to compress the spring 15 causing it to exert a growing output force on the spring housing 17 and, through the spring 35, on the final output member 26. As the spring 35 further compresses under this growing output force, the nut 48 (now being prevented by the clutch 41/42/46 from rotation) will be carried axially to the left with the tube 13 being free to do by virtud of the splined connection of the clutch part 46 to the hub 47 of the nut 48. Such movement of the nut 48 carries its flange 54A towards the stop 56.

The transducer 21 will be registering this growing output force and will be feeding back to the comparator 66 of the brake controller 63, a signal indicative of the value of the force. When this feed-back signal from the transducer is recognised by the comparator as being indicative of the braking force required as indicated by the degree of operation of the handle 64 of the brake controller, the comparator will terminate the signal previously applied over the line 65. Such termination will, firstly, energise the clutch 4 to "lock-in" the braking force being exerted and, secondly, de-energise the motor 1 to prevent any further increase of the braking force.

Clearly, from this "brake applied" condition of the actuator, the braking force exerted can be increased or reduced, by suitable further operation of the handle 64 of the braking controller. Such further operation, for increasing the braking force, will de-energise the clutch 4 and re-energise the motor 1 until the new and higher braking force is exerted and, for reducing the braking force, will merely de-energise the clutch 4 and energise the motor 1 in the reverse direction to allow the spring 15 to re-expand until the braking force (as detected by the transducer 21) has reduced to the new lower value whereupon the clutch 4 will be re-energised.

It has been assumed in the above-described operation that the braking force called for by operation of the controller has not exceeded that suitable to the loading of the vehicle. Were it to have been otherwise, before the called-for degree of braking had been effected, the flange 54A on the second nut 48 would have engaged the stop 56. Such engagement would have arrested the nut 48 at the permitted maximum level of braking force and, through the tube 13, would have prevented any further movement of the nut 10 and, therefore, any further compression of the spring 15. Hence, the maximum output force permitted to be exerted by the spring 15 on the final output member 26 would have been limited.

Brake Release

From the "brake applied" condition of the actuator, the brake is released by appropriate operation of the handle 64 of the brake controller 63. Such operation will, firstly, again de-energise the clutch 4 and, secondly, this time energise the motor 1 for operation in the opposite direction to that in which it was operated to apply the brake. Such reverse operation of the electric motor 1 will "wind-back" the nut 10 to the right thus, initially, allowing the spring 15 to recover until it is again housed by the spring housing 17 when the previously-applied braking force will have been fully recovered. In the process of such recovery, the spring 35 will also have fully recovered rotating the shaft 31 in the direction opposite to its previous rotation and, thereby, restoring the flange 54 to the position which it initially had spaced from the stop 56.

When the braking force has been fully relieved, the rigging spring normally incorporated in the lever system 60 will assist the return of the brake block 61 to its normal clearance from the wheel 62. This will occur as the final output member 26 is withdrawn to its original position, through the pin-and-slot connection 23/24, as the housing 17 is moved back to the right under the influence of the now housed spring 15, by continued rightward movement of the nut 10 as the ball-screw tube 6 continues to be rotated by the motor 1. During this further movement, the shaft 31 will also be returned to the right. However, once the spring 35 has fully recovered upon the braking force been fully relieved, such movement of the shaft 31 is purely axial as there is now no relative movement between the spring housing 17 and the shaft 31. Such mere axial movement of the shaft 31 is accommodated by the square-section endportion 38 of the shaft 31 sliding in the bore 39 in the clutch-operating part 40. Hence, there is no further rotation of part 40 during this phase of the recovery and, therefore, no further axial movement of the second nut 48. The axial movement of the nut 10 relative to the second nut 48 is accommodated by the second nut 48 spinning on its bearings 51 and 53 as the tube 13 of the nut 10 is forced through the second nut 48.

All the above described "brake release" movements continue until the friction ring 27 is moved back by movement of the final output member 26, to "remake" the pair of contacts 30. Upon this occurring, the clutch 4 will be re-energised to "lock" the actuator in the "brakes released" condition and the motor 1 de-energised to cease its operation.

Slack Adjustment

In the above described operations, it was assumed, as stated, that the original clearance between the brake block 61 and the wheel 62 was that required.

Had this clearance, in fact, been in excess of the required, the following would have occurred:

During the "brake application", because the clearance was greater than that required, the friction ring 27 would have engaged the end wall 27A of the housing 9 before the brake was fully applied. This being so, once the ring 27 was arrested from further leftward movement by this engagement, the continued movement of the final output member 26 would have forced that member 26 through the ring 27 by an extent indicative of by how much the clearance was excessive. Hence, upon the "brake release" operation, as this operation is terminated by the "remaking" of the pair of contacts 30 by their engagement by the friction ring 27, at the end of the "brake release" operation, the clearance between the brake block 61 and the wheel 62 would be restored to that required.

It will be seen, therefore, that the gap between the friction ring 27 and the end wall 27A of the actuator housing 9 is a measure of the required total stroke of the actuator.

Referring now to FIGS. 3 and 4, in which like references are used for like parts of the embodiment of FIG. 1, the actuator comprises an electric motor 1 which, through a worm 80, is arranged to rotate a worm-wheel 81. The worm-wheel 81 is secured to a nut 10 which is threadedly-engaged with a ball-screw tube 6 which is rotatably-supported in a pair of walls 82 and 83 upstanding from a base plate 84. Between the wall 82 and the nut 10 is a thrust bearing 84.

The ball-screw tube 6 has, at its left-hand end, a flange 14 between which a cup-shaped output member 17 extends a spring 15.

As so far described, it will be appreciated that if the motor 1 is energised in one direction, the nut 10 will be rotated relative to the ball-screw tube 6 axially to move that tube 6 to the left. Rotation of the motor 1 in the opposite direction will, equally, axially move the tube 6 to the right. Leftward movement of the tube 6 will, through the spring 15, move the output member 17 to the left. Should the output member 17, at any point, be prevented from such leftward movement, then the spring 15 will be compressed by continued operation of the motor 1 and thus caused to generate a growing output force on the output member 17 with the continued operation of the motor 1. From such a condition in which the motor 1 has compressed a spring 15 to cause it to generate the output force, reverse operation of the motor 1 will, firstly, reduce the output force being generated and, thereafter, allow the output member 17 to be moved back to the right with the spring 15.

Carried on a boss 85 of the output member 17 is a final output member 26 between which and the end face of the boss 85, is a belleville washer 86. Mounted on the interior of the output member 17 is a transducer 87 the detecting rod 88 of which projects through the base 85 and the belleville washer 86. The transducer 87 is thus arranged to detect compression of the belleville washer 86.

If the actuator is, therefore, arranged so as to exert a force on some part (not shown) which is normally axially spaced from the final output member 26, it will be seen that, as the final output member 26 is moved to the left by suitable operation of the motor 1 to effect the movements above described, the combination of the belleville washer 86 and the transducer 87 will allow detection of when the final output member 26 engages the part concerned. Conversely, in the reverse movement, the combination of the belleville washer 86 and the transducer 87 will allow detection of when the final output member 26 is about to leave the part concerned.

The output member 17 has co-axially mounted on its face opposite to the boss 85, a switch carrier 130. This carrier 86 has arranged around its circumference a series of switches shown diagrammatically at 87 in FIG. 3 and, still diagrammatically, in a developed projection of the cicumference of the carrier 130, in FIG. 5. The switches S1–S10 (FIG. 5) are equally spaced around the circumferential face of the carrier 130 and are arranged to be sequentially operated by a cam face 132 again shown in a developed projection in FIG. 5. The switches S1–S10 are each double switches of which one "makes/breaks" the lines D1–D10 and the other "makes/breaks" the lines E1–E10. The arrangement of the double switches of each of the switches S1–S10 is such that, for left-to-right movement of the cam 132, the E switch is "made" after the D switch is "broken" and, for right-to-left movement of the cam 132, the E switch is "broken" before the D switch is "made". Hence, in each direction of movement of the cam 132, there is a "dead" fraction of time during which both D and the E switch of each switch S1–S10 are "broken".

Returning now to FIG. 3, the cam surface 132 constitutes the end face of a cup-shaped cam 89 which is co-axially and non-rotationally secured by its "bottom" to one end of a shaft 90 threadedly engaged co-axially with the ball-screw tube 6. Adjacent its end remote from the cam 89, the shaft 90 has secured to it a pinion 91 which, as shown in FIG. 4, is meshed with an arcuate gear 92. The gear 92 is pivotted about an axis 93 and is oscillatable about the axis 93 by a rod 94 pivoted to the gear 92 at 95. Axial movement of the rod 94, therefore, rotates the gear 92 about its axis 93 and, thereby, rotates the pinion 91. Rotation of the pinion 91 similarly rotates the shaft 90 and, by virtue of its threaded engagement with the ball-screw tube 6, moves the cam 89 towards or away from (depending on the direction of movement of the rod 94) the switches S1–S10. The rod 94 is moved in accordance with the load of the vehicle and it will thus be seen that the switches S1–S10 are operated earlier or later equally in accordance with the load of the vehicle.

The electrical circuit for controlling the actuator above described is shown in FIG. 6 from which it can be seen that there is provided a brake controller 100 operated by handle 101. The controller 100 has (not shown) an internal switching arrangement by which, in dependence upon the position of the handle 101, three control wires 102, 103 and 104 can be energised in a selected combination. Energisation of the control wires 102–104, operates the solenoids of the corresponding relay 105–107 to operate their associated contacts C0–C7, B0–B7 and A0–A7. The relay contacts are fed from a supply over line 108. The relay contacts are in series with the switches D and E of the switches S1–S10, the switches D and E of each switch S1–S10 being in parallel one with the other. The output of all of the D switches are commoned to an output line 109 and the E switches to an output line 110. Energisation of the line 109 energises the motor 1 of the actuator to drive the ball-screw tube 6 to the left as viewed in FIG. 3 and energisation of the line 110 energises the motor 1 to drive the ball-screw tube 6 to the right.

The above described actuator operates in the following manner:

The actuator is for the operation of a railway vehicle brake and is shown in FIG. 3 in the "brakes released" condition. The final output member 26 would in context, be coupled to the brake blocks for operating them into engagement with and to exert braking force on, the vehicle wheel in a manner similar to that shown in FIG. 2.

Brake Application

To effect a brake application, the handle 101 of the brake controller is moved to a position corresponding to the degree of braking required.

Movement of the handle 101 away from its "brake released" position immediately energises the motor 1 of the actuator in a direction, through worm 80, worm-wheel 81, and nut 10, to move the ball-screw tube 6 to the left as viewed in FIG. 3. Through spring 15, output member 17, belleville washer 86 and final output member 26, such movement will move the brake block into engagement with the vehicle wheel. Such engagement of the brake will arrest the movement of the final output member 26 and continued operation of the motor 1 will cause the belleville washer 86 to collapse. This collapse will be detected by the transducer 87 which will thereby be operated to direct the energisation of the motor 1 via the line 108 and the contacts of the relays 105–107.

By moving the handle 101 of the brake controller 100 to effect the required degree of braking, the relays 105–107 will have been selectively energised to operate the various contacts A, B and C. For simplicity of description, let it be assumed that the degree of braking required has been indicated by movement of the handle 101 to a position in which only relay 105 has been energised. This energisation will reverse the position of all of its contacts C0–C7. It will, therefore, be seen that the line 0 which was previously the only wholly "made" line (indicative of "brake release") will now be "broken" and the only wholly "made" line will become line 4 leading to the switches D4 and E4 of the switch S4. E4 is, however, already "broken" so that the only completed circuit is via switch D4 which is in the line for energisation of the motor 1 to apply the brake. Hence, the motor 1 continues to be operated compressing the spring 15 and causing it to exert an output force on the output member 17. This force will be transmitted through the collapsed belleville washer 80 to the final output member 26 to be transmitted to the brake block as a braking force against the wheel.

As the ball-screw tube 6 continues it movement to the left as it collapses the spring 15, it will carry with it the cam 89. The cam face 88 will sequentially operate the switches S1, S2 and S3 but without any effect on the energisation of the motor 1 for the motor is only being energised over the line 4. However, when the ball-screw tube 6 has sufficiently compressed the spring 15 to cause it to generate the degree of braking required, the cam face 88 will operate the switch S4. In particular, it will operate the switch D4 of this switch S4, which was previously "made", to "break" it. By the "breaking" of switch D4, the line 4 over which the motor 1 was previously energised, will now be "broken" so that energisation of the motor 1 is now terminated. There being the "dead" space between the D and E switches of each switch S1–10, the "breaking" of switch D4 terminating the operation of the motor 1 results in cessation of travel of the cam face 88 before E4 is "made". Because of the worm-and-worm-wheel drive 80/81 between the motor 1 and the nut 10, this drive will "lock" to hold in the required degree of braking.

It will be remembered that the cam 89 was initially positioned by the mechanism 90–95 in accordance with the load of the vehicle. Hence, the degree of braking effected by operation of the motor 1 will be achieved irrespective of the load of the vehicle, the braking force generated by the spring 15 being adjusted to account for that load.

If, now, a different degree of braking is required, this is achieved by moving the handle 101 of the brake controller 100, to a new position. Such movement will change the status of energisation of the relays 105–107 and, through this changed status, complete a different line through the relay contacts. As the cam face 88 has previously moved over the switches S1–S4, the switches D1–D4 will successively have been "broken" and the switches E1–E4 successively "made" whilst the switches D5–D7 will continue to be "made" and the switches E5–E7 continue to be "broken".

Hence, if an increase in the degree of braking is now required, the re-positioning of handle 101 will, say, have also energised relay 106. This will cause the only wholly "made" line to be line 6. Thus, the motor 1 will be re-energised in the same direction as before to increase the braking effort until the cam face 88 has been moved to operate switch S6 and, thereby, operate its switch D6 to "break" the line 6 through which the motor 1 is now being energised.

Conversely, if a reduction in the degree of braking was required, the re-positioning of the handle 101 would, say, have additionally energised relay 107. The result of this would have been that only line 1 was now wholly "made".

It will be remembered that, in reaching switch S6, the cam 88 had previously operated switch S1 to "break" its switch D1 and make its switch E1. Hence the motor 1 will now be energised only over line 100. Such energisation will cause the motor 1 to be operation in its reverse direction to move the ball-screw tube 6 to the right (as viewed in FIG. 3). This movement will reduce the degree of compression of the spring 15 and, therefore, the degree of braking force which it causes to be exerted.

Brake Release

To release the brake, the handle 101 of the brake controller 100, is moved back to its "brake released" position. This will de-energise all of the relays 105–107 so that the only wholly "made" line is line 0. As the cam 88 has previously "broken" switch D1 and "made"

switch E1, the motor 1 is now energised over line 110 to operate it in a direction to move the ball-screw tube 6 to the right thus progressively permitting the spring 15 to recover.

When the spring 15 has fully recovered so that it is no longer exerting any output force on the output member 17, the belleville washer 86 will recover. The final output member 26, the output member 17 and the spring 15 will now all be returned to their initial position by the normal return spring in the brake rigging of the brake block.

Slack Adjustment

As observed above, as the brake block is about to leave the wheel, by the braking force having reduced to zero, the belleville washer 86 will recover. This will be "seen" by the transducer 87.

To ensure the normal required clearance between the brake block and the wheel, the electrical circuit controlling the motor 1 may be such that re-operation of the transducer 87 causes continued operation of the motor 1 to a pre-determined extent after operation of the transducer 87 so that, under the influence of the conventional rigging return spring, the brake block is allowed to move away from the wheel a pre-determined distance before the motor 1 ceases operation and the system is "locked" by the worm-and-worm-wheel connection 80/81.

Alternatively, the motor 1 may have a fly-wheel to which it is connected in a "brake release" operation, the motor 1 then being de-energised as soon as the transducer 87 "sees" the recovery of the belleville washer 86 and the fly-wheel continuing rotation of the nut 10 to a pre-determined degree even after de-energisation of the motor 1.

Referring now to FIG. 7, the embodiment here shown is generally of similar construction to that of FIG. 3 and, again, like references are used for like parts. The similarity of these two embodiments is such that no further description is here needed of the like parts.

In this embodiment, the motor 1 may conveniently be a stepper motor operable to rotate the nut 10 in discrete steps thus effecting compression of the spring 15 equally in steps so that it is caused to generate on the output member 17 an output force which also increases in steps.

To measure the value of the output force being generated, there is arranged in parallel with the spring 15 a transducer 120 which generates a signal indicative of the degree of compression of the spring 15. In an alternative, the transducer 87 may not merely be responsive only to the compression and recovery of the belleville washer 86 for the purpose described above with reference to the embodiment of FIG. 3, it may additionally incorporate a strain gauge by which the strain experienced by the final output member 26 in the transmission of the output force is measured. With such arrangements, either of the transducers 120 or 87 will give signals indicative of the value of the output force being generated on the output member 17 by the spring 15.

In this embodiment, the axial position of the shaft 10 is adjusted in accordance with the load of the vehicle by a second stepper motor 121 which, through a worm 122, is arranged to drive a worm-wheel 123. The worm-wheel 123 is threaded in its axial bore 124 and is thereby, threadedly-engaged with a screw-threaded portion 125 on the shaft 90.

At its end remote from the portion 125, the shaft 90 is provided with a flagne 126 which carries a proximity-detector 127.

Unlike the embodiment of FIG. 3, the above-described arrangement does not permit of variable-load control of the braking force exerted throughout its range, but merely serves as a load-limiting arrangement to ensure that the braking does not exceed that which is acceptable for the load of the vehicle. To achieve this load-limited braking characteristic, the second stepper motor 121 is, prior to a brake application, operated to an extent consistent with the load of the vehicle. This will axially position the flange 126 (and, therefore, the proximity-detector 127) to a position indicative of the load of the vehicle. If, now, a brake application is made by the energisation of the motor 1, the ball-screw tube 6 will axially be moved to the left to compress the spring 15 and thus cause it to exert a braking force in the manner above described with reference to FIG. 3. Should a braking force be demanded which is higher than that permissible with the particular load of the vehicle, before that demanded degree of braking is achieved, the flange 14 of the ball-screw tube 6 will engage the stem of the proximity detector 127 so actuating it and immediately terminating any further increase in the braking force by de-energising the motor 1 and terminating further compression of the spring 15.

A further proximity detector 128 is provided which, by engagement of its stem 129 by the rear face of the flange 14 on the ball-screw tube 6, can detect when the ball-screw tube 6 is fully retracted. This detector 128 may be employed when it is required fully to retract the brake block to replace it, the motor 1 then being energised to operate it in the "brake released" direction beyond any normal clearance of the brake block with the wheel until the detector 128 is operated.

The above described actuator is controlled by electrical circuitry incorporating a microprocessor as illustrated in FIG. 8. From a suitable brake controller (such as that shown in FIG. 6), the microprocessor can be fed with either a "brake application" signal or a "brake release" signal, the "brake application" signal being suitably modified to indicate the degree of braking required to be exerted. A signal from the transducer 120 or the strain gauge of the proximity detector 127, is also fed to the microprocessor which constantly monitors this signal and compares it to the "brake application" signal. Upon receiving a "brake application" signal, the microprocessor generates a signal to the motor 1 causing it to be energised in a direction to apply the brakes. As the braking force generated by the spring 15 on the output member 17 increases by continued operation of the motor 1 compressing the spring 15, the signal from the transducer 120 or the detector 127 will continuously vary accordingly. When this varying feed-back signal is found by the microprocessor to equate with the degree of braking demanded by the "brake application" signal, the output signal to the motor 1 will be terminated. Hence, operation of the motor 1 ceases, and the desired degree of braking is "locked-in" by the worm-and-worm-wheel drive 80/81. Should, prior to such equation, the proximity switch 127 be operated (indicating that the demanded degree of braking exceeded that permissible for the load of the vehicle), the microprocessor will immediately terminate further operation of the motor 1.

In a "brake release" operation, the brake controller will feed a "brake release" signal to the microprocessor.

This will cause an output signal to the motor 1 to operate it in the reverse direction to move the ball-screw tube 6 to the right (as viewed in FIG. 7). Such movement of the tube 6 will allow the spring 15 to recover thus reducing, eventually to zero, the braking force previously exerted on the output member 17 by the spring 15. When the braking force is, in fact, reduced to zero, this is indicative that the brake block is about to leave the wheel. At this point, the belleville washer 86 will recover and the proximity detector 87 will be operated so to indicate. The microprocessor will then receive a signal from the detector 17.

Upon receipt of the signal, the microprocessor will allow continued operation of the motor 1 to a pre-determined extent; that extent being pre-determined to give a normal clearance between the brake block and the wheel.

Instead of the microprocessor being programmed for this "over-run" of the motor 1 to effect the normal clearnace, the flywheel arrangement described above with reference to the FIG. 3 embodiment may be used.

Referring now to FIG. 9, it is in some contexts (and, particularly, some railway braking systems) to have a separate "stand-by" spring-applied brake actuator for use for "emergency applications." In the embodiment of FIG. 9, such a spring-applied brake actuator is shown in combination with an actuator construction in accordance with the present invention. As can be seen, the two actuators are arranged in tandem, the actuators "I" being the normal "service application" actuator constructed in accordance with the present invention and actuator "II" being the spring-applied "emergency application" actuator.

For the actuator "I", like references are used for like parts in the embodiments previously described. This actuator comprises an electric motor 1 which, through pinion 3 and gearwheel 5, drives a ball-screw shaft 6 mounted in a bearing 7 in the actuator housing 9.

This spring housing 17 has an axially-extending shaft 200 the free end of which is connected to the brake operated by the system. Hence, the shaft 200 will be moved with the housing 17 to bring the bake into engagement with the railway-vehicle wheel (both not shown).

As the motor 1 is continued to be operated, the shaft 200 and the spring housing 17 now being prevented from further movement by engagement of the brake with the wheel, the nut 10 will start to compress the spring 15 and exert an increasing braking force.

To determine that the braking force exerted is that which is required, the end wall 16 is fitted with a strain gauge 201. By this gauge 201 the force exerted through the spring 15 can be measured by measuring the strain being exerted by the spring 15 on the end wall 16. When the braking force being exerted is detected as being that required, the electrical circuit of the system energises the electric clutch 4 to lock the actuator "I" and to switch off the motor 1.

The electrically-controlled spring-applied brake actuator "II" also has an electric motor 221 which, through gearing 222, is arranged to rotate an internally-threaded tube 223 mounted in a bearing 224 in a housing 225 on which is carried the motor 221. As will be seen from FIG. 9, the housing 225 is a onepiece construction with the housing of the actuator "I".

The tube 223 is threadedly engaged with an externally threaded tubular member 226 having at its end remote from its thread, a radial flange 227. Housed between this radial flange 227 and a radially inwardly projecting end wall 228 of the housing 225, is a brake-force applying spring 229.

The flange 227 has, towards its centre, a conical face 230. A complementary conical face 231 is provided on a nut 232 which is threadedly engaged with a reversible thread on a threaded portion 233 of the shaft 200 of brake-force applying member 17 which, it will be seen, is common to both actuators "I" and "II". The flange 227 and the nut 232 thus constitute clutch members of which the respective faces 230 and 231 constitute clutch faces interengageable by movement of the nut 232 to the right (as viewed in FIG. 1).

The nut 232 can be moved to the right by a spring 234 which is tending to spin the nut 232 along the threaded portion 233 of the output member 17. To control the nut 232, it has a leftward (as viewed in FIG. 1) tubular extension 235 which constitutes the armature of a solenoid 236.

Like actuator "I", the actuator "II" also has an electric clutch 237 by which the shaft of the motor 221 can be locked to hold the tubular member 226 in any desired position.

The actuator "II" above described operates in the following manner:

In the brake released condition as shown in FIG. 9, the motor 221 has previously been operated to drive (through gearing 222 and tube 223) the tubular member 226 to the right as viewed in FIG. 9. This will have compressed the brake-force applying spring 229 which will have been and will continue to be held in that condition by energisation of the electric clutch 237, which locks the tubular member 226 in the position shown in FIG. 9. After such locking, the motor 221 will have been de-energised.

Solenoid 236 will then have been energised to hold the nut 232 in its position shown in FIG. 9.

If, from this condition, a brake application is required, the solenoid 236 is first de-energised. This frees the spring 234 to spin the nut 232 up the threaded portion 233 of the shaft 200 of the output member 17 until its clutch face 231 engages the clutch face 230 in the tubular member 226. Shortly after the de-energisation of the solenoid 236, the electric clutch 237 is also de-energised. This, in unlocking the tubular member 226, allows the brake-force applying spring 229 to extend and, through the engaged clutch faces 230 and 231, to move the shaft 200 of the output member 17 to the left (as viewed in FIG. 1) to engage the brake with the vehicle wheel (both not shown). After such engagement, the spring 229 exerts a braking force on the brake.

The potential problem of the compounding of a "service brake application" effected with the actuator "I" with an "emergency brake application" effected with the actuator "II", is avoided with the above described equipment by an electrical circuit which ensures that the motor 1 and electric clutch 4 of actuator "I" cannot be energised whilst the solenoids 236 and electric clutch 237 of actuator "II" are de-energised.

The actuator "II" further includes a micro-switch 238. This micro-switch is for the purpose of limiting the maximum applied braking force exerted by the spring 229 by limiting the compression of that spring.

In railway vehicles particularly where the loaded-totare weight ratio is high, if the maximum brake-applying force exertable by the spring 229 were sufficient to effect an emergency stop of a fully-loaded vehicle, a dangerous situation might arise were the same force to be allowed to be exerted when the vehicle was empty or less than fully loaded.

The micro-switch 238 measures the extension of the spring 229 and, therefore, the force exerted by the spring 229 on the shaft 200 of the output member 17 when it is clutched thereto and the spring 229 is freed for extension from the position of the micro-switch 238. The micro-switch 238 is adjustable in position in the direction (left/right as viewed in the drawing) of extension of the spring 229.

The micro-switch 238 is positioned such as to be engaged by the flange 227 of the nut 230. The switch 238 is movable along the length f a slot 240 provided in the housing 225, the slot 240 extending in the same direction as that of the extension of the spring 229.

From a fully-extended condition of the spring 229, as the motor 221 is operated to compress the spring 229, when the flange 227 reaches the micro-switch 238, this switch will be operated, firstly to discontinue operation of the motor 221 and, secondly, to operate the clutch 237 to "lock" the nut 230 in the position in which its flange operated the micro-switch 238.

If, therefore, the micro-switch 238 has been positioned along the slot 240 in dependence upon the load of the vehicle, the spring 229 will now have been pre-set to exert a force which is equally dependent upon the load of the vehicle. Thus, when the actuator "II" is operated as above described, the force exerted by the spring 229 on the shaft 200 and, therefore, the braking force exerted thereby, will also be dependent on the loading of the vehicle.

To simplify the setting arrangement for reductions in load, the motor 221 can be arranged to let the spring 229 out to a "tare" position when the vehicle is stationary and then compress the spring 229 up to a required "load" position.

A suitable electric circuit to effect such control is shown in FIG. 10.

A circuit indicative of the required degree of braking is fed to Logic Unit I over line 400. Through the Logic Unit I, over line 401 the energisation of the motor 1 is controlled as is also, over line 402, the electric clutch 4. The Logic Unit I is also fed, over the line 403, by the strain gauge 201 with feed-back signals indicative of the degree of force being exerted by the actuator "I". Hence, for a normal "service" brake operation, the Logic Unit I ensures the necessary degree of operation of the motor 1 and the control of the electric clutch 4 to secure the degree of brake application or release called for by the input signal applied over line 400.

Another Logic Unit II similarly controls the motor 221 and its electric clutch 237 over lines 405 and 406 respectively. Over line 407, the Logic Unit II controls the solenoid 236 and receives an input signal over line 408 from the micro-switch 238. A supply line 409 incorporates an Emergency Switch, the line feeding to both Logic Unit I over line 410 and the Logic Unit II over line 411. Opening of the Emergency Switch operates Logic Unit I to ensure that both the electric motor 1 of the actuator "I" and its clutch 4 cannot be energised by an input signal over line 400 or, if already energised, are de-energised. Over line 411, opening of the Emergency Switch gives an input signal to the Logic Unit II to de-energise the solenoid 236 and the cluch 237 and hold de-energised the motor 221. The maximum degree of braking permitted to be exerted by the actuator "II" is determined by the Logic Unit II upon operation of the micro-switch 238 feeding the Logic Unit II with an input signal over line 408.

We claim:

1. An electric actuator comprising an output member movable from a first position to a second, force exerting position [,]; spring means for exerting a variable force on said output member for transmission by said output member, when the output member is in the force exerting position thereof, [the degree of rotation of which is variable for varying the variable force exerted by said spring means on said output member in accordance with the varying degree of rotation of the electric motor, said spring means comprising a spring one end of which abuts the output member and the opposite end of which abuts a second member movable by the electric motor in the direction of the length of the spring] *said spring means comprising a second member and a spring one end of which abuts the output member and other end of which abuts said second member;* and an electric motor *means, including an electric motor having a rotatable output shaft, for causing displacement of said second member in the direction of the length of the spring by an amount determined by the number of angular degrees through which the output shaft of the motor is rotated so as to thereby vary the variable force exerted by the spring on said output member.*

[2. An actuator as claimed in claim 1, wherein said spring means comprises a spring and one end of the spring abuts the output member and the opposite end abuts a second member movable by the electric motor in the direction of the length of the spring.]

3. An actuator as claimed in claim [2] *1*, wherein the second member is threadedly-engaged with a third member and relative rotation of said third member is effected by operation of the electric motor.

4. An actuator as claimed in claim [2] *1*, further comprising detecting means for detecting the force exerted on the output member, for generating a signal indicative of said force being exerted and for terminating the operation of the electric motor when the signal indicates that the force exerted is of a desired value.

5. An actuator as claimed in claim 4, wherein the detection means comprises a strain gauge mounted on the output member.

6. An actuator as claimed in claim 5, wherein the detection means comprises means responsive to the length of the spring.

7. An actuator as claimed in claim 6, wherein the detection means comprises a first part movable with the output member and a second part movable with the second member.

8. An actuator as claimed in claim 7, wherein the second part of the detection means is variable positionable with respect to the second member in the direction of the length of the spring.

9. An actuator as claimed in claim 8, wherein the actuator comprises a brake actuator for a vehicle and adjustment means are provided for positioning the second part of the detection means with respect to the second member in accordance with the load on the vehicle.

10. An actuator as claimed in claim 9, wherein one of the parts of the detection means carries a plurality of switches and the other part carries cam means for operating said switches.

11. An actuator as claimed in claim 9, wherein the second part is threadedly-engaged with the second member and the second part and the second member relatively rotated variably to position the second part with respect to the second member.

12. An actuator as claimed in claim 1, further comprising a final output member to which the output force generated on the said output member can be transmitted, the electric motor initially operating to move the spring means, the output member and the final output member bodily together until further movement of the final output member is arrested whereafter continued operation of the electric motor compresses the spring means to generate the output force.

13. An actuator as claimed in claim 12, further comprising means between the output member and the final output member for detecting the arrest of the movement of the final output member.

14. An actuator as claimed in claim 1, further comprising limiting means for limiting the maximum value of the output force exerted by said output member.

15. An actuator as claimed in claim 1, further comprising limiting means for terminating the operation of the electric motor when the value of the output force exerted by the output member reaches a maximum value.

*16. An electric actuator comprising an output member movable from a first position to a second, force exerting position; spring means for exerting a variable force on said output member for transmission by said output member when said output member is in the force exerting position thereof, and drive means operatively associated with said spring means for varying the force exerted by said spring means on said output member, said drive means including an electric motor, coupling means disposed between said spring means and said electric motor in abutment with said spring means and movable by said electric motor to vary the variable force exerted by said spring means on said output member, and means for actuating said electric motor to move said coupling means to a selected, variable end position so that said spring means exerts a corresponding force on said output member and for terminating actuation of said electric motor when said coupling means is moved to said selected end position so as to maintain the corresponding force exerted by the spring means on the output member.*

• • • • •